United States Patent [19]

LaRosa et al.

[11] Patent Number: 5,323,421
[45] Date of Patent: Jun. 21, 1994

[54] METHOD AND APPARATUS OF ESTIMATING CHANNEL QUALITY IN A RECEIVER

[75] Inventors: Christopher P. LaRosa, Lake Zurich; Michael J. Carney, Schaumburg, both of Ill.

[73] Assignee: Motorola, Inc., Schaumburg, Ill.

[21] Appl. No.: 954,172

[22] Filed: Sep. 30, 1992

[51] Int. Cl.$^5$ .................. H04B 3/46; H04B 17/00; H04Q 1/40
[52] U.S. Cl. ...................... 375/10; 375/100; 375/101; 455/226.1; 371/5.1
[58] Field of Search .............. 375/10, 94, 95, 100, 375/101; 371/20.2, 201, 5.1; 370/13, 17; 455/226.1, 226.2, 226.3

[56] References Cited

U.S. PATENT DOCUMENTS 4,817,117  3/1989  Tasto et al. .................. 375/111
5,214,687  5/1993  Känsäkoski et al. .......... 371/5.1

OTHER PUBLICATIONS

LaRosa et al., "A Fully Digital Hardware Detector for $\pi/4$ QPSK", Chicago Corporate Research and Development Center, Motorola Inc. 1992.

Primary Examiner—Stephen Chin
Assistant Examiner—Bryan Webster
Attorney, Agent, or Firm—Kirk W. Dailey

[57] ABSTRACT

The present disclosure includes a discussion of a method of and apparatus for channel quality estimation (CQE) in a receiver. Each channel is divided into observation intervals and sub-intervals. The duration of the sub-interval is chosen as the largest interval in which the channel is essentially static. The CQE collects error information for each symbol of the sub-interval, forming a sub-interval error value. The CQE maps the sub-interval error value into a sub-interval bit error rate (BER) estimate. The mapping is a non-linear function dependent on the specific radio system. Then, the CQE averages the sub-interval BER estimates over the entire observation interval, forming an interval BER estimate. Finally, the CQE compares the interval BER estimate to a predetermined threshold, forming a channel quality estimation decision for each observation interval.

15 Claims, 7 Drawing Sheets

| CQE RANGE | CQE DECISION | BER RANGE(%) |
|---|---|---|
| $\overline{CQE} > T_3$ | 11 | 3.0<BER |
| $T_2 < \overline{CQE} < T_3$ | 10 | 1.0<BER<3.0 |
| $T_1 < \overline{CQE} < T_2$ | 01 | 0.3<BER<1.0 |
| $\overline{CQE} < T_1$ | 00 | BER<0.3 |

*FIG.7*  700

| BER RANGE(%) | STANDARD BER(%) | CQE DECISION |
|---|---|---|
| 3.0<BER | 5.5 | 11 |
| 1.0<BER<3.0 | 1.6 | 10 |
| 0.3<BER<1.0 | 0.55 | 01 |
| BER<0.3 | 0.1 | 00 |

*FIG.2*  200

| 801 $CQE_{sub}[l]$ | 803 $Pr\{\Sigma(k) > 5\pi/32\}$ | 805 STATIC BER | 807 $CQE[l]$ |
|---|---|---|---|
| 0 | 0.00 | 0.000 | 0 |
| 1 | 0.10 | 0.0068 | 1 |
| 2 | 0.20 | 0.0307 | 5 |
| 3 | 0.30 | 0.0860 | 13 |
| 4 - 10 | >0.375 | 0.5000 | 74 |

*FIG.8*  800

| CHANNEL BER (%) | CONVENTIONAL CQE (40Hz FADING) | CONVENTIONAL CQE (STATIC) | PROPOSED CQE (40Hz FADING) | PROPOSED CQE (STATIC) |
|---|---|---|---|---|
| 5.5 | 99.8% | 0.0% | 99.2% | 100.0% |
| 1.6 | 95.8% | 0.0% | 87.6% | 100.0% |
| 0.55 | 97.2% | 1.1% | 90.6% | 94.0% |
| 0.1 | 100.0% | 0.0% | 91.0% | 98.9% |

*FIG.6*  600

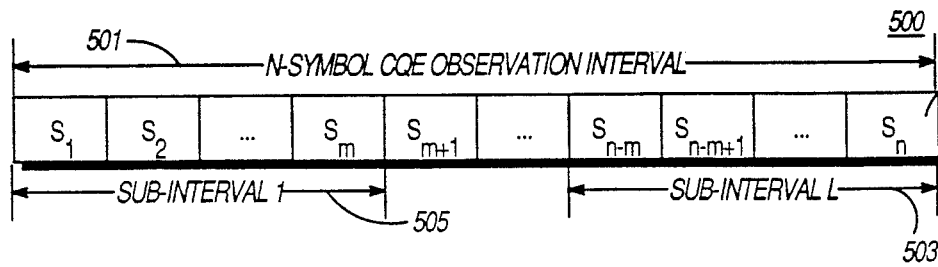

*FIG.5*

— PRIOR ART —

METHOD AND APPARATUS OF ESTIMATING CHANNEL QUALITY IN A RECEIVER

FIELD OF THE INVENTION

This invention generally relates to receivers and more specifically to a method of estimating the channel quality in a receiver detecting a digital modulation scheme.

BACKGROUND OF THE INVENTION

It is beneficial to estimate the quality of the receiving channel in a radiotelephone system. A radiotelephone system typically contains multiple fixed-site transceivers which are capable of serving multiple radiotelephones. The quality of service between each of the fixed-site transceivers and the particular radiotelephone varies. If the radiotelephone can estimate the quality of the receiving channel, then the radiotelephone system can choose the most appropriate fixed-site transceiver.

Several different conventional methods of estimating the quality of the receiving channel exist. Typically, the estimate of the channel quality includes an estimate of the bit error rate (BER). A particular time division multiple access (TDMA) radiotelephone system divides time into superframes, frames and timeslots as shown in FIG. 13. The system specification requires a channel quality estimation (CQE) for each superframe. Each superframe is referred to as an observation interval. The radiotelephone shall identify one of four possible performance categories, with each category corresponding to a specified range of channel BERs as illustrated in Table 200 of FIG. 2. Moreover, the specification requires that the radiotelephone identify the correct performance category at the standard BERs in 40 Hz flat Rayleigh fading.

The accuracy of conventional channel quality estimation techniques is insufficient because of the limited number of bits within the CQE observation interval in the aforementioned TDMA system requiring a CQE each superframe. "Techniques for Estimating the Bit Error Rate in the Simulation of Digital Communications", IEEE Journal on Selected Areas in Communications, VOL. SAC-2, No. 1, January 1984 may be referenced to determine the proper number of bits to observe for an estimated BER with a desired confidence level.

A superframe in this system includes 36 frames. A frame contains 140 symbols assigned to each radiotelephone. Thus, a radiotelephone receives 5040 symbols every superframe. Each symbol contains two bits. Two conventional CQE techniques include (1) counting bit errors over known portions of the frame (e.g., sync words, preambles, etc.), and (2) re-encoding the decoded data bits and comparing the resulting bitstream against the received channel bits. This second technique operates only on forward error corrected (FEC) bits. Both of these techniques are inappropriate for this particular system because the number of bit errors observed over a superframe would be insufficient to provide the desired accuracy.

CQE accuracy can be improved using soft error information available at the output of the demodulator. Phase error information is a particular type of soft error information. Accumulating the phase error magnitude (or squared phase error magnitude) over the CQE observation interval and comparing the result against a pre-determined set of thresholds would improve the CQE. However, this technique is too sensitive to the channel fading rate and provides different results for static and fading environments. This is a result of the detector error magnitude (or squared error magnitude) being a non-linear function of the channel bit error rate.

An accurate CQE is desirable for use in a TDMA receiver. The CQE should be accurate to a predetermined confidence level in both a fading and static environment for an observation interval having a limited number of observation bits.

BRIEF DESCRIPTION OF THE DRAWINGS

FIG. 2 includes a table describing the requirements of a particular radiotelephone system.

FIG. 5 is an illustration of a generic CQE observation interval in accordance with the present invention.

FIG. 6 includes a table comparing performance between a conventional CQE and the CQE of the preferred embodiment.

FIG. 7 includes a table illustrating the CQE decisions generated by the CQE circuit of FIG. 4.

FIG. 8 includes a table illustrating the non-linear mapping of the system described in the preferred embodiment.

DESCRIPTION OF A PREFERRED EMBODIMENT

The preferred embodiment encompasses a method and apparatus for estimating the channel quality in a receiver. The channel quality estimator (CQE) divides the received data into equally sized and spaced observation intervals and sub-intervals. The CQE creates an independent estimate for each observation interval, reflecting the quality of the received channel.

First, the CQE generates error information for each symbol of the received signal. In the preferred embodiment, the channel quality estimator uses phase error magnitude information derived at each symbol interval to create the error information. The CQE may also implement other equally sufficient and common error information generators. Next, the CQE collects the generated error information for each sub-interval, forming a sub-interval error value. The duration of the sub-interval is chosen as the largest interval in which the channel is essentially static. Next, the CQE maps the sub-interval error value into a sub-interval channel quality estimate. In the preferred embodiment, the sub-interval channel quality estimate is a bit error rate estimate and the mapping is a non-linear function dependent on the specific radio system. Finally, the CQE averages the sub-interval channel quality estimates over the entire observation interval, forming an interval channel quality estimate.

In the preferred embodiment, the CQE compares the interval channel quality estimate to a predetermined threshold, forming a channel quality estimation decision for each observation interval. The radiotelephone can use the CQE decision or the radiotelephone can transmit the CQE decision back to the fixed-site transceiver. Generally, the CQE decision influences decisions of the radiotelephone system. These decisions include choice of the appropriate fixed-site transceiver to serve the radiotelephone and power output adjustment of the fixed-site transceiver and/or the radiotelephone.

Figure 1:
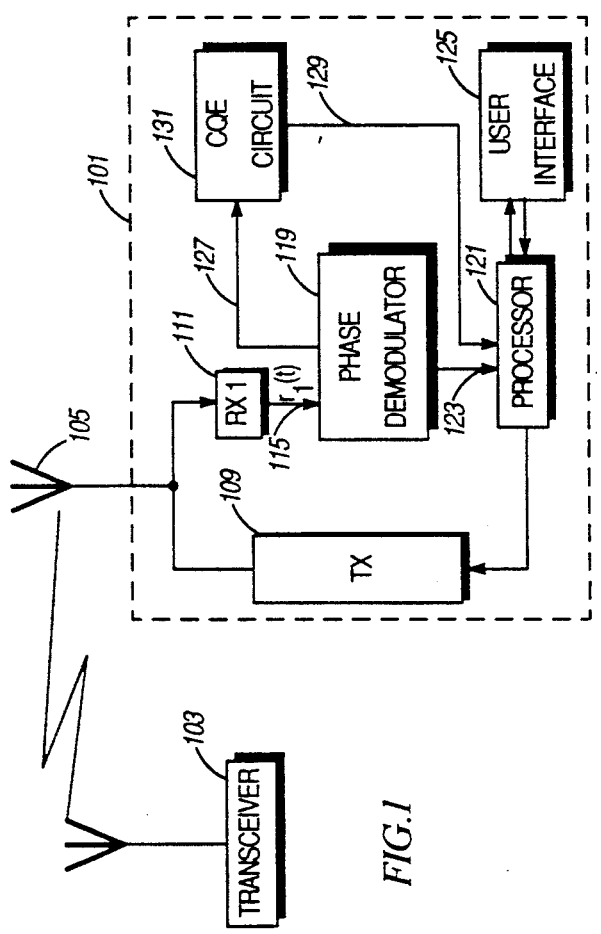
FIG. 1 is a block diagram of a radiotelephone system in accordance with the present invention.

FIG. 1 is a block diagram of a radiotelephone system in accordance with the present invention. In the radiotelephone system, the fixed-site-transceiver 103 sends and receives radio frequency (RF) signals to and from mobile and portable radiotelephones contained within a fixed geographic area served by the fixed-site-transceiver 103. The radiotelephone 101 is one such radiotelephone served by the fixed-site-transceiver 103.

Figure 3:
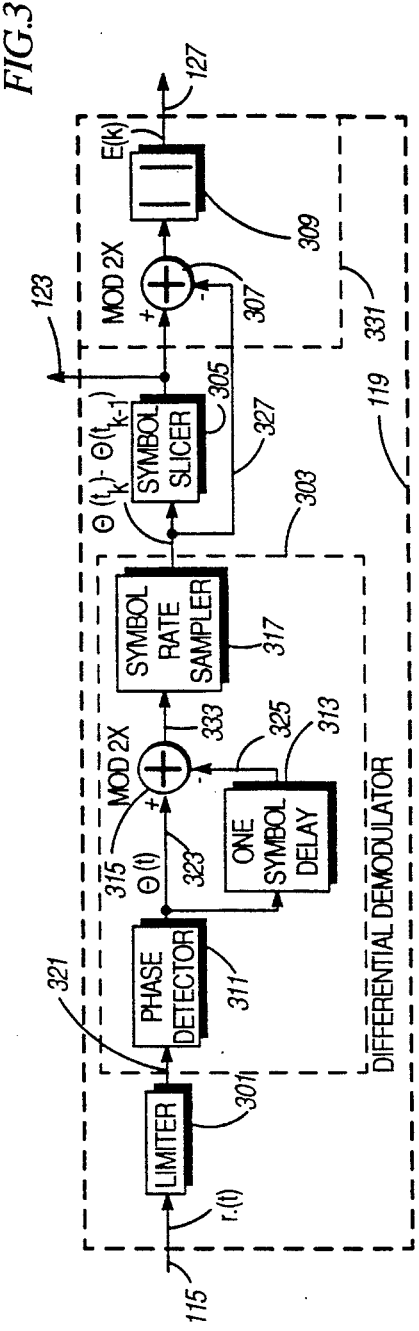
FIG. 3 is a detailed block diagram of the phase demodulator illustrated in FIG. 1 in accordance with the present invention.
Figure 4:
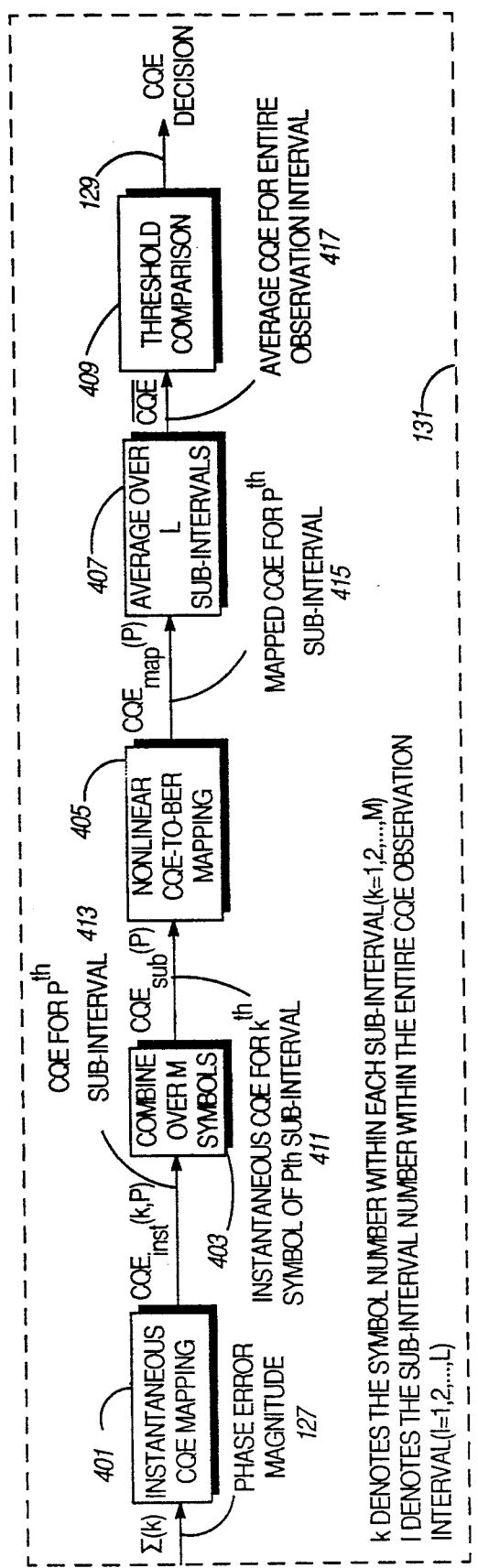
FIG. 4 is a detailed block diagram of the channel quality estimator (CQE) circuit illustrated in FIG. 1 in accordance with the present invention.

While receiving signals from the fixed-site-transceiver 103, the radiotelephone 101 uses the antenna 105 to couple the RF signals and convert the RF signals into electrical RF signals. The radio receiver 111 receives the electrical RF signals for use in the radiotelephone 101. The receiver 111 generates the intermediate frequency signal 115 denoted as $r_1(t)$ in FIG. 1. This intermediate frequency (IF) signal 115 is input into the phase demodulator 119. The phase demodulator 119 outputs the symbol decision signal 123 for use by the processor 121 and phase error magnitude signal 127 for use by the CQE circuit 131. FIG. 3 illustrates the details of the phase demodulator 119. The CQE circuit 131 uses the phase error magnitude signal 127 to generate a CQE decision signal 129. The processor 121 in turn uses the CQE decision signal 129. FIG. 4 illustrates the details of the CQE circuit 131. The processor 121 includes a microprocessor such as a MC68000 available from Motorola, Inc., and associated memory. The processor 121 formats the symbol decision signal 123 into voice and/or data for the user interface 125. The user interface contains a microphone, speaker and a keypad.

Upon the transmission of RF signals from the portable radiotelephone 101 to the fixed-site-transceiver 103, the processor 121 formats the voice and/or data signals from the user interface 125. In the preferred embodiment, the formatted signals include the CQE decision signal 129. The formatted signals are input into the transmitter 109. The transmitter 109 converts the formatted data into electrical RF signals. The antenna 105 receives the electrical RF signals and outputs the signals as RF signals. The transceiver 103 receives the RF signals.

FIG. 3 is a block diagram of the phase demodulator 119 as illustrated in FIG. 1. The phase demodulator 119 includes a limiter 301, a differential demodulator 303, a symbol slicer 305 and an error magnitude signal generator 331. The limiter 301 receives the IF signal 115 and limits the voltage of the IF signal 115 to reference levels corresponding to logic levels 1 and 0. The limiter 301 outputs a limited receive signal 321. The differential demodulator 303 is digital and includes a phase detector 311, which generates a phase signal 323. The phase signal 323 is input into a delay 313 and an adder 315 forming a phase difference signal 333 for the symbol rate sampler 317. The symbol rate sampler 317 samples the phase difference signal 333 once per symbol to produce the sampled differential phase signal 327. The sampled difference phase signal 327 output from the differential demodulator 303 is input into a symbol slicer 305. The symbol slicer 305 determines the decision point that the differential phase signal 327 is closest to and outputs the corresponding decision point value as the symbol decision value 123. The phase error generator 331 generates the phase error magnitude signal 127. First, the phase error generator 331 creates a phase error signal 329 equal to the difference between the sampled differential phase signal 327 and the signal's closest known symbol decision value 123. The absolute value generator block 309 outputs the absolute value of the phase error signal 329 resulting in the phase error magnitude signal 127.

Figure 11:
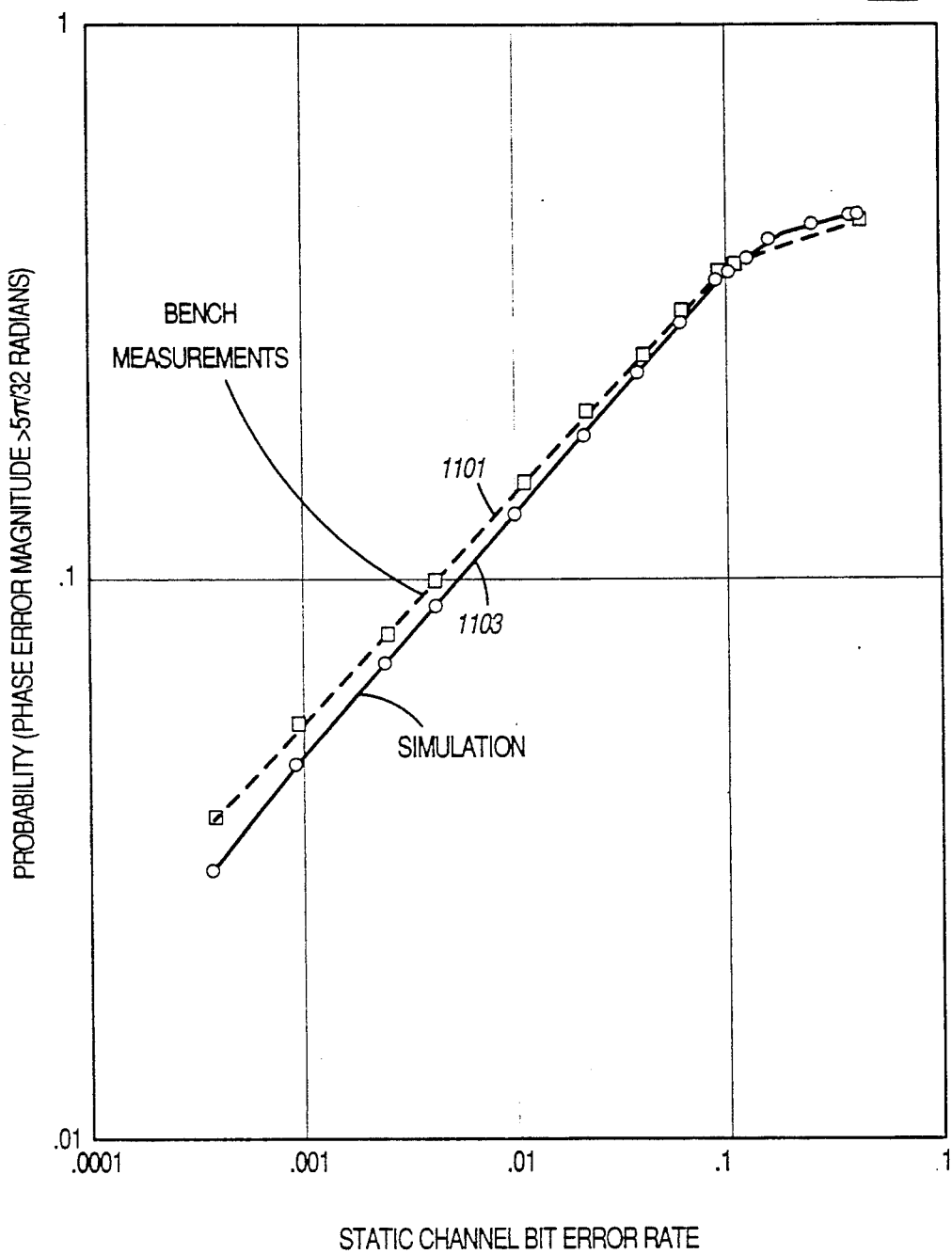
FIG. 11 is a graph plotting the probability the phase error magnitude will exceed the threshold $5\pi/32$ radians versus the static channel bit error rate in accordance with the present invention.

The phase error magnitude signal 127 provides a measure of instantaneous channel quality for each received symbol. Graph 1100 of FIG. 11 illustrates the probability of the phase error magnitude signal 127 exceeding $5\pi/32$ radians as a function of the channel bit error probability. This figure assumes $\pi/4$ Quadrature Phase Shift Keying (QPSK) signalling in a static additive, white Gaussian noise channel.

Figure 10:
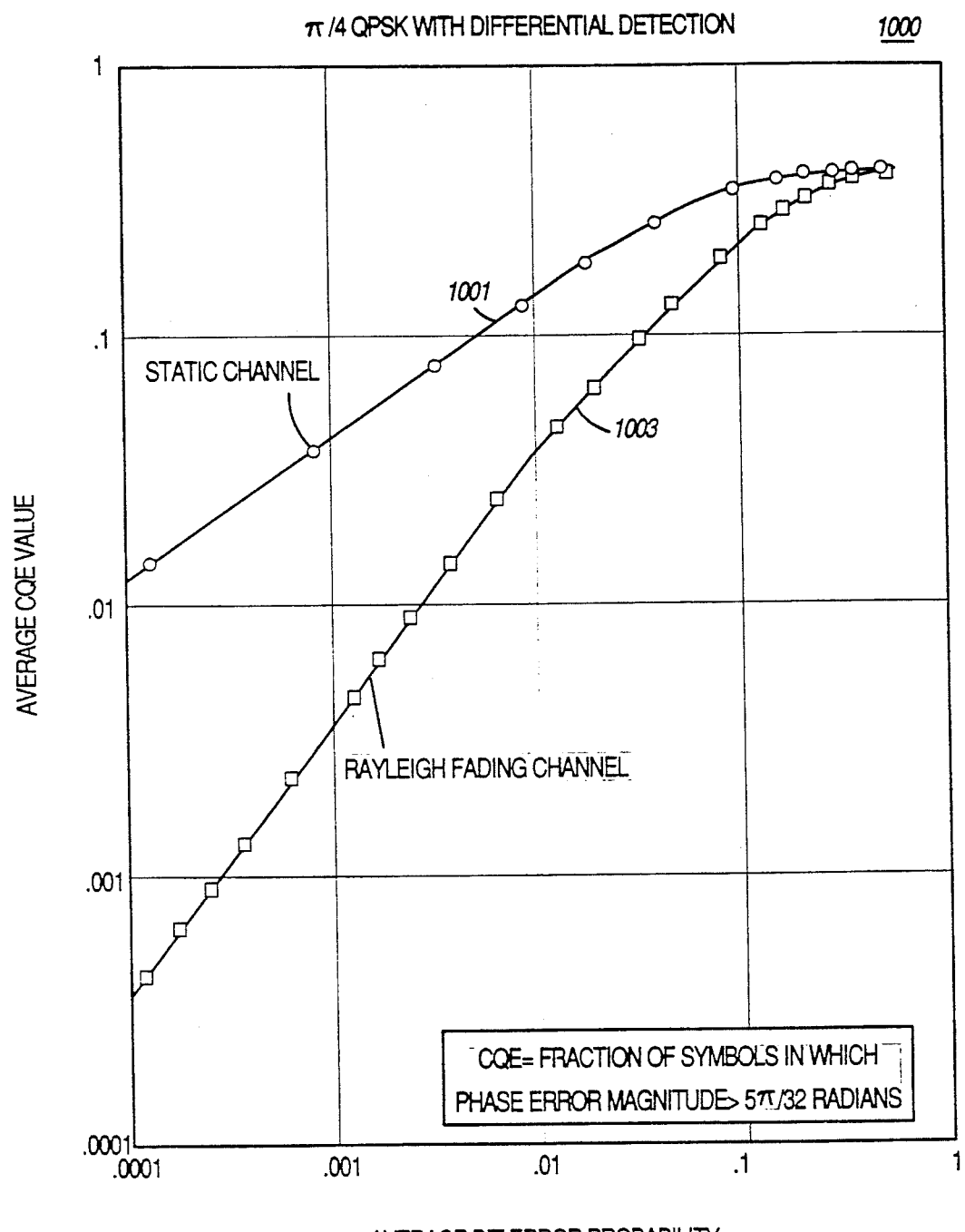
FIG. 10 is a graph plotting the average CQE value versus the average bit error probability for a static and a Rayleigh fading channel using conventional CQE.

Bench measurements plot 1101 and simulation measurements plot 1103 illustrate the correlation of the bit error rate performance with the measured phase error magnitude. However, the relationship between the bit error rate and the measured phase error magnitude for the radiotelephone in the preferred embodiment is a non-linear relationship. The characteristics in static and fading environments diverge significantly because of this non-linear relationship. This divergence is illustrated by curves 1001 and 1003 of graph 1000 in FIG. 10. As a result, averaging the phase error magnitude over an interval in which the quality of the receiving channel varies is not sufficient to determine the bit error rate over that same interval.

The channel quality estimation technique of the preferred embodiment solves the aforementioned non-linearity problem by partitioning the observation interval into sub-intervals. The length of a sub-interval is determined through experimentation with the specific system. The optimal sub-interval duration is the largest interval over which the receiving channel appears approximately static, i.e., where the channel quality is estimated to be constant.

Graph 500 of FIG. 5 illustrates the observation interval and sub-intervals determined to provide the best performance for the radio system of the preferred embodiment. Generally, the observation interval has N symbols as illustrated by 501. Each of the L sub-intervals contains M symbols, such that N equals L times M. The preferred embodiment assumes that the maximum fading rate for the system would be approximately equal to 100 Hertz. Testing the system using the maximum fading rate determined that the optimum duration, M, is 10 symbols, ensuring static received channel quality. The observation interval, N, in the preferred embodiment is equal to 5040 as required by the radiotelephone system. Thus, the number of sub-intervals, L, is equal to 504 in the preferred embodiment.

FIG. 4 is a detailed block diagram of the channel quality estimation circuit 131 of FIG. 1. Here, the channel quality estimation circuit 131 receives the phase error magnitude signal 127 and generates a CQE decision signal 129. Block 401 generates the instantaneous channel quality estimate for the Kth symbol of the Pth sub-interval using the phase error magnitude signal 127. K varies from 1 to M and P denotes the sub-interval number which varies from 1 to L. In the preferred embodiment, M equals 10 and L is equal to 504. The instantaneous channel quality estimate is generally known as symbol interval error information. Block 401 indicates a symbol interval error when the phase error magnitude exceeds a predetermined threshold. In the preferred embodiment, the predetermined threshold is $5\pi/32$ radians. This threshold can vary depending upon the requirements of a specific receiver system.

The instantaneous channel quality estimate signal 411 is input into block 403. Block 403 determines the number of symbols in a given sub-interval P having a phase error magnitude exceeding the predetermined threshold. Block 403 generates the sub-interval error value signal 413 for each of the L sub-intervals.

The sub-interval error value signal 413 is input into the block 405. Block 405 maps the sub-interval error value signal 413 into a corresponding channel quality estimate using a predetermined static channel quality mapping. The preferred embodiment uses an estimated bit error rate (BER) mapping. The BER characteristic is a function of the modulation scheme, the demodulator structure, the instantaneous mapping function, and the sub-interval length of the radio system. Table 800 of FIG. 8 is an illustration of the non-linear mapping as defined for the radio system of the preferred embodiment. Column 801 represents the number of times in which the phase error magnitude of a given symbol of sub-interval P exceeds the predetermined threshold $5\pi/32$ radians. The corresponding bit error rate in column 805 is determined from the static CQE versus bit error rate curve of previously discussed graph 1100 of FIG. 11. Column 803 is the probability that the instantaneous phase error magnitude exceeds $5\pi/32$ radians during the Pth sub-interval. The mapped CQE numbers in column 807 are approximately linearly to the BER numbers in column 805. In accordance with the relationship between columns 803 and 807 in Table 800, block 405 maps the sub-interval error value signal 413 into the BER estimate signal 415. The signal 415 is input to block 407.

Block 407 calculates the average channel quality estimate 417 of the entire observation interval by averaging the L mapped sub-interval BER estimates according to the equation $$CQE = \frac{1}{L} \sum_{P=1}^{L} CQE_{map}(P).$$

The average CQE value 417 for the observation interval is input into a threshold comparison at block 409.

Block 409 makes the CQE decision, comparing the average CQE with a predetermined set of thresholds. The preferred embodiment utilizes Table 700 of FIG. 7. The thresholds T1, T2 and T3 of 701 are selected to provide the maximum margin against the CQE accuracy requirement as defined by the radiotelephone system in the preferred embodiment. Threshold block comparison 409 is not necessary for the invention but is an additional feature required by the preferred embodiment. The output of the preferred embodiment threshold block 409 is the channel quality estimate decision signal 129 which is a 2 bit CQE decision as determined by column 703. The channel quality estimate circuit 131 may be implemented in a programmable gate array such as a Xilinx 3090 available from Xilinx, Inc.

Figure 9:
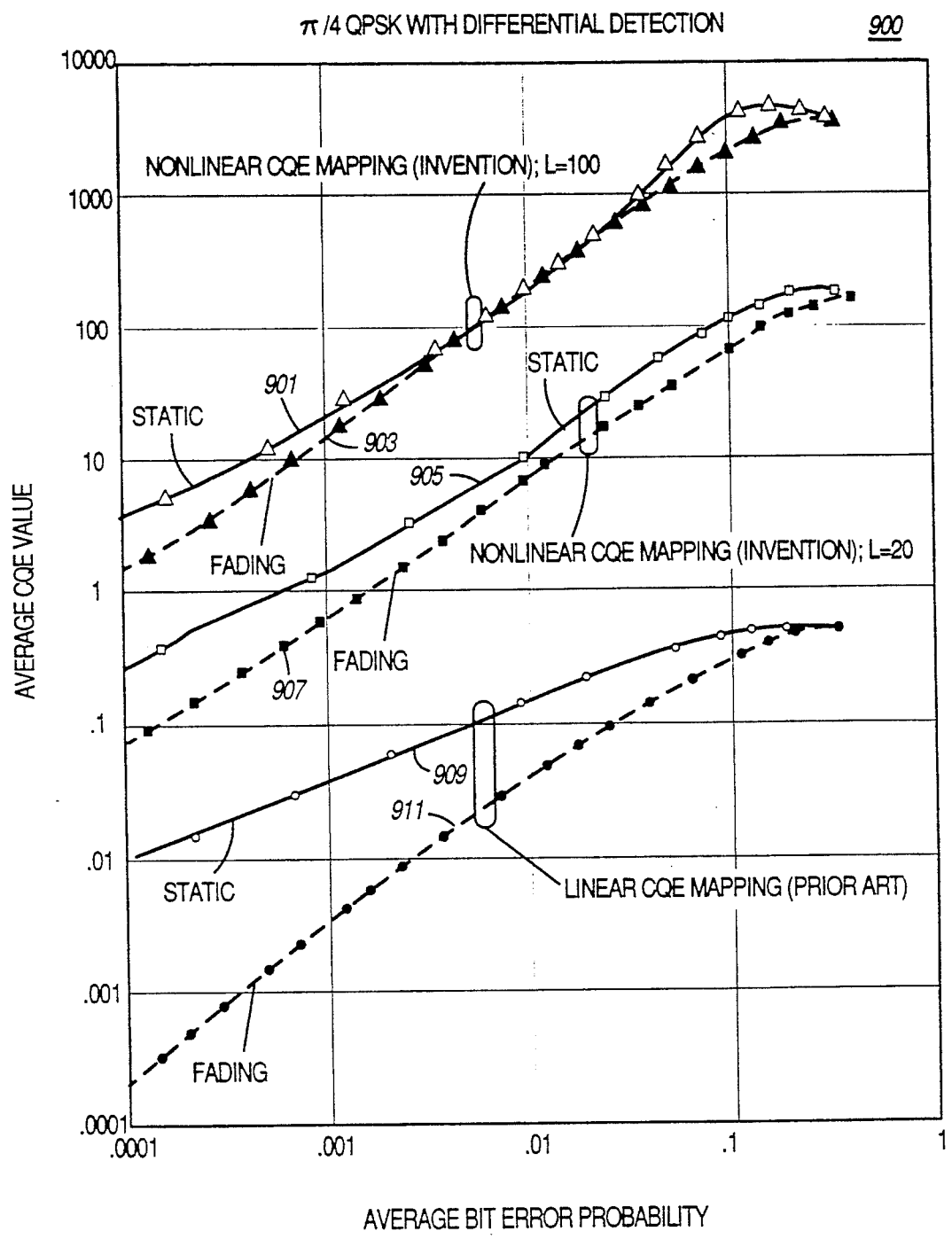
FIG. 9 is a graph plotting the average CQE value versus the average bit error probability for linear and non-linear CQE mappings.

Graph 900 of FIG. 9 plots the average channel quality estimate as a function of average bit error probability in both static and fading environments. Plots 909 and 911 reflect a linear mapping over the observation interval as described in the prior art and referred to as a conventional method. Plot 909 is simulated in a static environment and plot 911 is simulated in a fading environment. The differences between plots 909 and 911 illustrate the problems with the conventional method. Specifically, the conventional method yields a different channel quality estimate depending on the conditions, fading or static, to which the receiver is exposed.

Plots 905 and 907 reflect a CQE as described in the preferred embodiment. Plot 905 is measured in a static environment and plot 907 is measured in a fading environment. Note that the plots 905, 907 closely match each other. This close matching indicates that the average CQE value is an accurate estimate of the average bit error probability in both a static and fading environment. Additionally, plots 901 and 903 represent a CQE similar to the system reflected in plots 905 and 907. The second system represented by plots 901 and 903 averages over a larger number of sub-intervals, L. As illustrated by the plots 901, 903, 905, 907 a close match between static and fading characteristics results when the length of the observation interval is increased.

Figure 12:
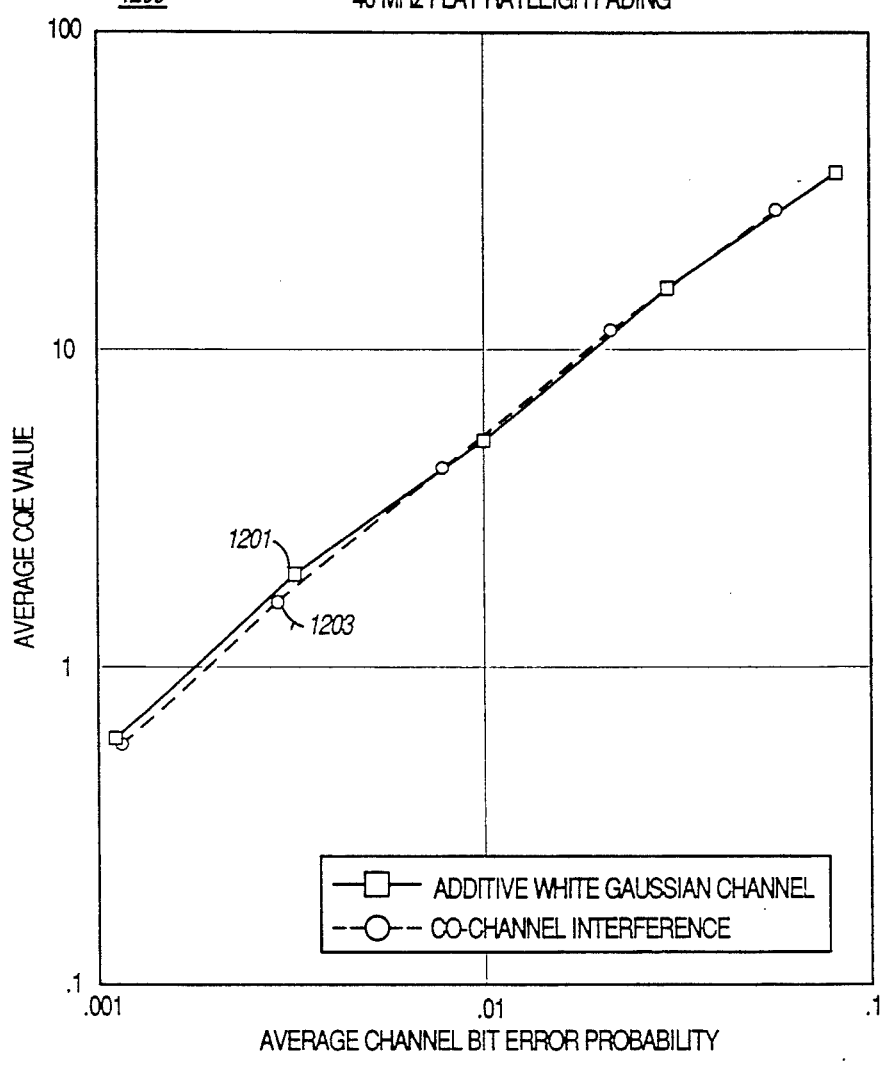
FIG. 12 is a graph plotting the average CQE value versus the average channel bit error probability in accordance with the present invention.
Figure 13:
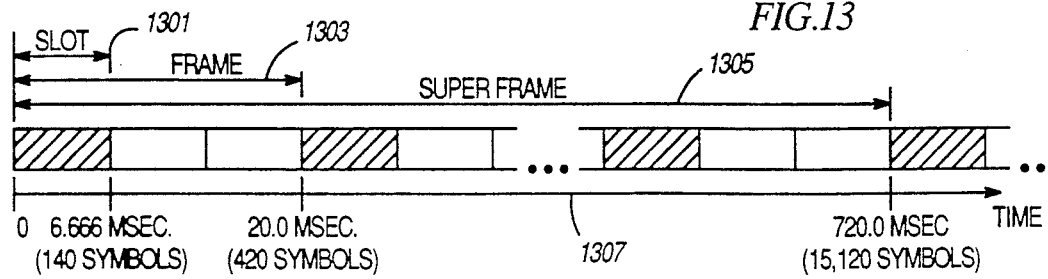
FIG. 13 is an illustration of a particular time division multiple access (TDMA) radiotelephone system that divides time into superframes, frames and timeslots.

Graph 1200 of FIG. 12 plots a simulation of the average CQE versus the average bit error probability. Plot 1201 illustrates the results for the preferred embodiment operating in an additive, white Gaussian noise channel. Plot 1203 illustrates the results for the preferred embodiment operating in an environment having co-channel interference. The close match between plots 1201 and 1203 indicates that the preferred embodiment will perform equally well in noise and interference-limited environments.

Bench measurements are summarized in Table 600 of FIG. 6. Table 600 provides a performance comparison of a conventional CQE method and the method of the preferred embodiment. The conventional method utilizes a linear mapping over the observation interval. At the standard BERs specified in Table 200 of FIG. 2, both methods predict the proper performance category with an accuracy that exceeds 85% in 40 Hz Rayleigh fading. The method of the preferred embodiment maintains this accuracy while operating in a static environment. However, the conventional method rarely predicts the proper performance category while operating in a static environment. Thus, the CQE as described herein provides an accurate estimate of the bit error probability for a received signal in both a fading and static environment for an observation interval having a limited number of observation bits.

What is claimed is:

1. A method of estimating the channel quality over a first predetermined interval length in a receiver having a digital modulation scheme and receiving symbols having a symbol interval, the method comprising the steps of:

partitioning the first predetermined interval length into a predetermined number of sub-intervals;

generating error information for each symbol interval;

combining said error information over each sub-interval, forming a sub-interval error value;

mapping said sub-interval error value into a sub-interval channel quality estimate; and averaging said sub-interval channel quality estimate over the first predetermined interval forming an interval channel quality estimate.

2. A method of estimating the channel quality in accordance with claim 1 wherein said step of generating error information for each symbol interval further comprises the steps of:

measuring the phase error magnitude of each symbol;

comparing said phase error magnitude of each symbol to a predetermined threshold; and indicating, responsive to said phase error magnitude exceeding said predetermined threshold, a symbol interval error.

3. A method of estimating the channel quality in accordance with claim 1 wherein said step of partitioning further comprises the step of choosing the largest sub-interval over which channel quality remains constant.

4. A method of estimating the channel quality in accordance with claim 1 wherein said step of mapping is further defined as a non-linear mapping of the sub-interval error value into a sub-interval channel quality estimate which is proportional to a sub-interval bit error rate.

5. A method of estimating the channel quality in accordance with claim 1 wherein said step of mapping is dependent upon characteristics of the receiver, the modulation scheme and the sub-interval length.

6. A method of estimating the channel quality in accordance with claim 1 further comprising the steps of:

comparing said interval channel quality estimate to at least a first threshold; and generating a channel quality estimate responsive to said step of comparing.

7. A radio receiver operating in a radio system and capable of receiving radio frequency signals from at least a first fixed-site transceiver on a first channel, the radio receiver comprising:

means for creating symbol decisions from the received radio frequency signals; and means for estimating the quality of the first channel over a first predetermined interval length comprising:

means for partitioning the first predetermined interval length into a predetermined number of sub-intervals, means for generating error information for each symbol decision, means for combining said error information over each sub-interval, forming a sub-interval error value, means for mapping said sub-interval error value into a sub-interval channel quality estimate, and means for averaging said sub-interval channel quality estimate over the first predetermined interval, forming an interval channel quality estimate.

8. A radio receiver in accordance with claim 7 wherein said means for generating error information for each symbol decision further comprises:

means for measuring the phase error magnitude of each symbol;

means for comparing said phase error magnitude of each symbol to a predetermined threshold; and means for indicating, responsive to said phase error magnitude exceeding said predetermined threshold, a symbol interval error.

9. A radio receiver in accordance with claim 7 wherein said means for partitioning further comprises means for choosing the largest sub-interval length over which channel quality remains substantially constant.

10. A radio receiver in accordance with claim 7 wherein said means for mapping is further defined as a non-linear mapping of the sub-interval error value into sub-interval channel quality estimate which is proportional to a sub-interval bit error rate.

11. A radio receiver in accordance with claim 7 wherein said means for mapping is dependent upon the radio system including the characteristics of the receiver, the modulation scheme and the sub-interval length.

12. A radio receiver in accordance with claim 7 further comprising:

means for comparing said interval channel quality estimate to at least a first threshold; and means for generating a channel quality estimate responsive to said step of comparing.

13. A radio receiver in accordance with claim 7 further comprising:

second means for estimating the quality of a second channel over a second predetermined interval length; and means for choosing a preferred fixed-site transceiver utilizing said estimated quality of said first and second channel.

14. A radiotelephone capable of communicating between multiple fixed-site transceivers, the radiotelephone including a receiver and a transmitter and receiving radio frequency signals from at least a first fixed-site transceiver on a first channel, the radiotelephone comprising:

means for creating symbol decisions from the received radio frequency signals;

means for estimating the quality of the first channel over a first predetermined interval length comprising:

means for partitioning the first predetermined interval length into a predetermined number of sub-intervals, means for generating error information for each symbol decision, means for combining said error information over each sub-interval, forming a sub-interval error value, means for mapping said sub-interval error value into a sub-interval bit error rate (BER) estimate, means for averaging said sub-interval BER estimate over the first predetermined interval, forming an interval BER estimate signal, and means for creating a first channel quality estimate decision using said interval BER estimate signal; and means for transmitting said first channel quality estimate to said first fixed-site transceiver.

15. A radiotelephone in accordance with claim 14 further comprising:

second means for estimating the quality of a second channel over a second predetermined interval length forming a second channel quality estimate; and second means for transmitting said second channel quality estimate to said first fixed-site transceiver, such that said first fixed-site transceiver may choose a preferred fixed-site transceiver.

* * * * *